(12) United States Patent
Nachenberg et al.

(10) Patent No.: US 8,271,774 B1
(45) Date of Patent: Sep. 18, 2012

(54) CIRCUMSTANTIAL BLOCKING OF INCOMING NETWORK TRAFFIC CONTAINING CODE

(75) Inventors: Carey Nachenberg, Northridge, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 2994 days.

(21) Appl. No.: 10/639,158

(22) Filed: Aug. 11, 2003

(51) Int. Cl.
*H04L 29/06* (2006.01)
(52) U.S. Cl. ........................ 713/150; 713/154
(58) Field of Classification Search .................. 726/11; 713/150, 154
See application file for complete search history.

(56) References Cited

U.S. PATENT DOCUMENTS

| | | | |
|---|---|---|---|
| 5,440,723 A | 8/1995 | Arnold et al. | |
| 5,452,442 A | 9/1995 | Kephart | |
| 5,473,769 A | 12/1995 | Cozza | |
| 5,572,590 A | 11/1996 | Chess | |
| 5,696,822 A | 12/1997 | Nachenberg | |
| 5,715,174 A | 2/1998 | Cotichini et al. | |
| 5,715,464 A | 2/1998 | Crump et al. | |
| 5,758,359 A | 5/1998 | Saxon | |
| 5,812,763 A | 9/1998 | Teng | |
| 5,889,943 A | 3/1999 | Ji et al. | |
| 5,951,698 A | 9/1999 | Chen et al. | |
| 5,956,481 A | 9/1999 | Walsh et al. | |
| 5,960,170 A | 9/1999 | Chen et al. | |
| 5,978,917 A | 11/1999 | Chi | |
| 5,987,610 A | 11/1999 | Franczek et al. | |
| 6,052,709 A | 4/2000 | Paul et al. | |
| 6,070,244 A | 5/2000 | Orchier et al. | |
| 6,072,830 A | 6/2000 | Proctor et al. | |
| 6,088,803 A | 7/2000 | Tso et al. | |
| 6,094,731 A | 7/2000 | Waldin et al. | |
| 6,104,872 A | 8/2000 | Kubota et al. | |
| 6,108,799 A | 8/2000 | Boulay et al. | |
| 6,167,434 A | 12/2000 | Pang | |
| 6,192,379 B1 | 2/2001 | Bekenn | |
| 6,199,181 B1 | 3/2001 | Rechef et al. | |
| 6,275,938 B1 | 8/2001 | Bond et al. | |
| 6,304,975 B1 * | 10/2001 | Shipley ........................ 726/22 |
| 6,338,141 B1 | 1/2002 | Wells | |
| 6,357,008 B1 | 3/2002 | Nachenberg | |
| 6,370,648 B1 | 4/2002 | Diep | |

(Continued)

FOREIGN PATENT DOCUMENTS

DE 100 21 686 A1 11/2001

(Continued)

OTHER PUBLICATIONS

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc_pelican.html.

(Continued)

*Primary Examiner* — Jason Gee
(74) *Attorney, Agent, or Firm* — Fenwick & West LLP

(57) ABSTRACT

An incoming network traffic manager circumstantially blocks incoming network traffic (103) containing code (107). The incoming network traffic manager (101) monitors (201) incoming network traffic (103) addressed to a target computer (105). The network traffic manager (101) detects (203) incoming network traffic (103) containing code (107). The network manager (101) blocks (205) incoming traffic (103) containing code (107) from reaching the target computer (105), responsive to circumstances being such that it is undesirable to allow incoming traffic (103) containing code (107) to reach the target computer (105).

26 Claims, 7 Drawing Sheets

U.S. PATENT DOCUMENTS

| | | | |
|---|---|---|---|
| 6,493,007 B1 | 12/2002 | Pang | |
| 6,535,891 B1 | 3/2003 | Fisher et al. | |
| 6,552,814 B2 | 4/2003 | Okimoto et al. | |
| 6,611,925 B1 | 8/2003 | Spear | |
| 6,622,150 B1 | 9/2003 | Kouznetsov et al. | |
| 6,678,734 B1 | 1/2004 | Haatainen et al. | |
| 6,697,950 B1 | 2/2004 | Ko | |
| 6,721,721 B1 | 4/2004 | Bates et al. | |
| 6,748,534 B1 | 6/2004 | Gryaznov et al. | |
| 6,763,462 B1 | 7/2004 | Marsh | |
| 6,813,712 B1 | 11/2004 | Luke | |
| 6,851,057 B1 | 2/2005 | Nachenberg | |
| 6,910,134 B1 | 6/2005 | Maher et al. | |
| 2001/0039579 A1* | 11/2001 | Trcka et al. | 709/224 |
| 2002/0004908 A1 | 1/2002 | Galea | |
| 2002/0013911 A1* | 1/2002 | Cordella et al. | 713/201 |
| 2002/0035696 A1 | 3/2002 | Thacker | |
| 2002/0046275 A1 | 4/2002 | Crosbie et al. | |
| 2002/0083175 A1 | 6/2002 | Afek et al. | |
| 2002/0091940 A1 | 7/2002 | Wellborn et al. | |
| 2002/0157008 A1 | 10/2002 | Radatti | |
| 2002/0162015 A1 | 10/2002 | Tang | |
| 2002/0178374 A1 | 11/2002 | Swimmer et al. | |
| 2003/0023865 A1 | 1/2003 | Cowie et al. | |
| 2003/0051026 A1 | 3/2003 | Carter et al. | |
| 2003/0051155 A1* | 3/2003 | Martin | 713/201 |
| 2003/0065926 A1 | 4/2003 | Schultz et al. | |
| 2003/0088680 A1* | 5/2003 | Nachenberg et al. | 709/229 |
| 2003/0115485 A1 | 6/2003 | Milliken | |
| 2003/0120951 A1 | 6/2003 | Gartside et al. | |
| 2003/0126449 A1 | 7/2003 | Kelly et al. | |
| 2003/0140049 A1 | 7/2003 | Radatti | |
| 2003/0191966 A1 | 10/2003 | Gleichauf | |
| 2003/0212902 A1 | 11/2003 | van der Made | |
| 2003/0236995 A1 | 12/2003 | Fretwell, Jr. | |
| 2004/0015712 A1 | 1/2004 | Szor | |
| 2004/0015726 A1 | 1/2004 | Szor | |
| 2004/0030913 A1 | 2/2004 | Liang et al. | |
| 2004/0073811 A1 | 4/2004 | Sanin | |
| 2004/0111636 A1 | 6/2004 | Baffes et al. | |
| 2004/0128536 A1* | 7/2004 | Elzam et al. | 713/201 |
| 2004/0158730 A1 | 8/2004 | Sarkar | |
| 2004/0162808 A1 | 8/2004 | Margolus et al. | |
| 2004/0181687 A1 | 9/2004 | Nachenberg et al. | |
| 2005/0021740 A1 | 1/2005 | Bar et al. | |
| 2005/0044406 A1 | 2/2005 | Stute | |
| 2005/0132205 A1 | 6/2005 | Palliyil et al. | |
| 2005/0177736 A1 | 8/2005 | De los Santos et al. | |
| 2005/0204150 A1 | 9/2005 | Peikari | |
| 2006/0064755 A1 | 3/2006 | Azadet et al. | |

FOREIGN PATENT DOCUMENTS

| | | | |
|---|---|---|---|
| EP | 1 280 039 A | | 1/2003 |
| GB | 2 364 142 A | | 1/2002 |
| WO | WO 97/39399 A | | 10/1997 |
| WO | WO 01/91403 A | | 11/2001 |
| WO | WO 02/05072 A | | 1/2002 |
| WO | WO 02/093334 A2 * | | 11/2002 |

OTHER PUBLICATIONS

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology with Striker32", Oct. 1, 1999, 2 pages, [Online]. Retrieved on Nov. 11, 2003. Retrieved from the Internet:<URL:http://symantec.com/press/1999/n991001.html>. Author unknown.

Szor, P. and Ferrie, P., Attacks on Win32, Virus Bulletin Conference, Sep. 1998, Virus Bulletin Ltd., The Pentagon, Abingdon, Oxfordshire, England, pp. 57-84.

Szor, P. and Ferrie, P., "Attacks in Win32 Part II", Virus Bulletin Conference, Sep. 2000, Virus Bulletin Ltd., The Pentagon, Abingdon, Oxfordshire, England, pp. 47-68.

Von Babo, Michael, "Zehn Mythnum Computerviren: Dichtug Und Wahrheit Uber Den Schrecken Des Informatkzeitlers," *Technische Kundschau*, Hallwag, Bern CH vol.84, No. 36. Sep. 4, 1992, pp.44-47.

Delio, M., "Virus Throttle a Hopeful Defense", Wired News, Dec. 9, 2002, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfpP.asp>.

"Description of Windows 2000 Windows File Protection Feature (Q222193)", [online], first published May 26, 1999, last modified Jan. 12, 2002, [retrieved on Apr. 9, 2002]Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http://www.wackyb.co.nz/mesfp.html>.

Szor, P., "Memory Scanning Under Windows NT", Virus Bulletin Conference, Sep. 1999, Virus Bulletin Ltd., The Pentagon, Abingdon, Oxfordshire, England, pp. 1-22.

Von Babo, Michael, "Zehn Mythen um Computerviren: Dichtung und Wahrheit über den Schrecken des Informatikzeitalters," Technische Rundschau, Hallwag, Bern, Switzerland, vol. 84, No. 36. Sep. 4, 1992, pp. 44-47.

Toth, et al "Connection-history based anomaly detection" Proceedings of the 2002 IEEE Workshop on Information Assurance and Security. West Point, NY, Jun. 17-19, 2002. pp. 30-35.

Kephart, Jeffrey et al., "An Immune System For Cyberspace" IBM Thomas J. Watson Research Center, IEEE 1997, pp. 879-884.

Symantec Corporation, "Norton AntiVirus Corporate Edition", 1999, Version 1, pp. 15,22.

Bakos et al., "Early Detection of Internet Work Activity by Metering ICMP Destination Unreachable Activity.", Proc. Of SPIE Conference on Sensors, and Command, Control, Communicitions and Intelligence, Orlando, Apr. 2002.

\* cited by examiner

CIRCUMSTANTIAL BLOCKING OF INCOMING NETWORK TRAFFIC CONTAINING CODE

TECHNICAL FIELD

This invention pertains to generally to computer security, and more specifically blocking incoming network traffic containing code under desired circumstances.

BACKGROUND ART

Computers connected to networks are vulnerable to network based malicious computer code attacks, such as worms, viruses and Trojan horses. As used herein, "malicious computer code" is any code that enters a computer without an authorized user's knowledge and/or without an authorized user's consent. Network based malicious computer code attacks attempt to transmit malicious code to a target computer, and then run the malicious code on that target computer.

Some existing security mechanisms attempt to distinguish between malicious code and benevolent code. Such mechanisms can block transmissions containing what is suspected to be malicious code. Such mechanisms can be very useful under certain circumstances. However, distinguishing between malicious code and benevolent code can be difficult. If the algorithm used is too aggressive, a certain amount of desired, benevolent code can falsely be classified as malicious, and blocked from reaching the target computer. On the other hand, if the algorithm used is not aggressive enough, some malicious code can be incorrectly classified as benevolent, and thus allowed to enter and infect the target computer.

There are circumstances under which attempting to make such a distinction is neither necessary nor desirable. Specifically, there are specific circumstances under which no code should be transmitted to a target computer. What is needed are methods, computer readable media and systems that, under the appropriate circumstances and only under the appropriate circumstances, block all incoming network traffic containing code.

DISCLOSURE OF INVENTION

The present invention comprises methods, systems, and computer readable media for circumstantially blocking incoming network traffic (103) containing code (107). An incoming network traffic manager (101) monitors (201) incoming network traffic (103) addressed to a target computer (105). The incoming network traffic manager (101) detects (203) incoming network traffic (103) containing code (107). The incoming network traffic manager (101) blocks (205) incoming network traffic (103) containing code (107) from reaching the target computer (105), responsive to circumstances being such that it is undesirable to allow incoming network traffic (103) containing code (107) to reach the target computer (105).

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
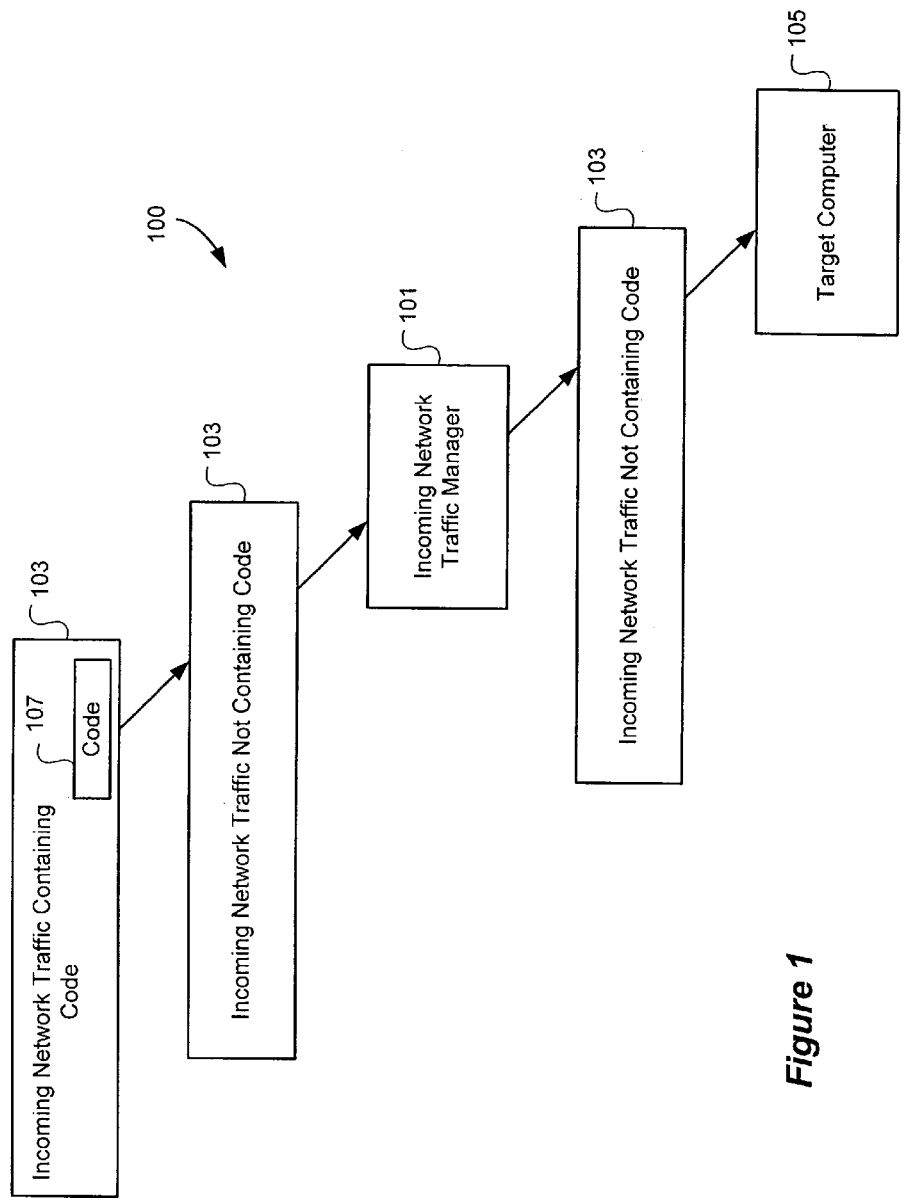
FIG. 1 is a block diagram illustrating a high level overview of a system for practicing some embodiments of the present invention.

FIG. 1 illustrates a high level overview of a system 100 for performing some embodiments of the present invention. An incoming network traffic manager 101 monitors incoming network traffic 103 addressed to a target computer 105. It is to be understood that although the incoming network traffic manager 101 is illustrated as a single entity, as the term is used herein an incoming network traffic manager 101 refers to a collection of functionalities which can be implemented as software, hardware, firmware or any combination of the three. Where an incoming network traffic manager 101 is implemented as software, it can be implemented as a standalone program, but can also be implemented in other ways, for example as part of a larger program, as a plurality of separate programs, or as one or more statically or dynamically linked libraries. In some embodiments the incoming network traffic manager 101 is incorporated into a firewall. In other embodiments, the incoming network traffic manager 101 is incorporated into other components as desired, for example an intrusion detection system, an intrusion detection system application proxy, a router, a switch, a stand alone proxy, a server, a gateway and/or a client computer. In some embodiments, the incoming network traffic manager 101 is distributed between more than one of the above and/or other components.

It will be understood by those of ordinary skill in the relevant art in light of this specification that the incoming network traffic manager 101 can monitor incoming network traffic 103 in various ways, depending upon the specific implementation of the incoming network traffic manager 101. For example, where the incoming network traffic manager 101 is incorporated into a firewall or intrusion detection system application proxy, the incoming network traffic manager 101 could monitor the incoming network traffic 103 by scanning the incoming network traffic 103 in the form of a stream. Where the incoming network traffic manager 101 is incorporated into a router or switch, the incoming network traffic manager 101 could monitor the incoming network traffic 103 by analyzing incoming packets. The specific implementation mechanics for monitoring incoming network traffic 103 will be readily apparent to one of ordinary skill in the relevant art in light of this specification.

As illustrated in FIG. 1, the monitored incoming network traffic 103 can include both incoming network traffic 103 containing code 107 and incoming network traffic 103 not containing code 107. As the incoming network traffic manager 101 monitors the incoming network traffic 103, the incoming network traffic manager 101 detects incoming network traffic 103 that contains code 107. The implementation mechanics for detecting the presence of code 107 in incoming network traffic 103 are known to those of ordinary skill in the art. Various methodologies for code 107 detection are known, all of which are within the scope of the present invention. For example, instruction sets for popular processors can be profiled in a number of ways. Operation codes and sequences thereof have statistical profiles that are distinct from other forms of content. Therefore, the incoming network traffic manager 101 can detect code 107 by scanning for known bit patterns unique to instruction sets and other properties related to sequences of operation codes. Of course, other techniques can be used as well, for example entropy measures and Markov chain techniques. Dissembling content that turns out not to be code 107 will quickly reveal an abundance of illegal instructions and nonsensical sequences. It is to be understood that these are only examples of ways in which code 107 can be detected. Various code 107 detection algorithms are known to ordinarily skilled artisans, to whom the usage thereof within the present context will be readily apparent, in light of this specification.

The incoming traffic manager 101 proceeds to block incoming network traffic 103 containing code 107 from reaching the target computer 105, responsive to circumstances being such that it is undesirable to allow incoming network traffic 103 containing code 107 to reach the target computer 103. There are various circumstances under which this would be the case, and such circumstances are discussed in detail later in this specification. As illustrated in FIG. 1, responsive to such circumstances, the incoming traffic manager 101 allows incoming network traffic 103 that does not contain code 107 to reach the target computer 103, but blocks incoming network traffic 103 that does contain code 107.

Figure 2:
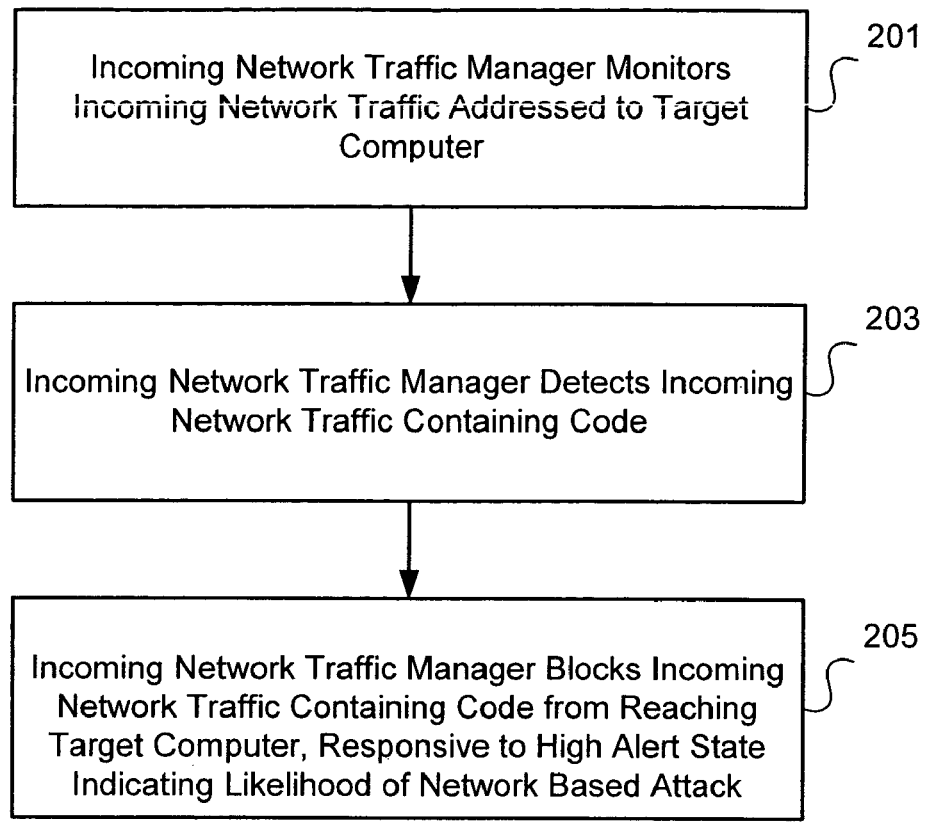
FIG. 2 is a flowchart illustrating steps for performing some embodiments of the present invention, in which the circumstances rendering it undesirable to allow incoming network traffic containing code to reach the target computer comprise a high alert state, indicating a likelihood of a network based attack.

FIG. 2 illustrates steps for performing some embodiments of the present invention, in which the circumstances rendering it undesirable to allow incoming network traffic 103 containing code 107 to reach the target computer 103 comprise a high alert state, indicating a likelihood of a network based attack. As will be understood by those of ordinary skill in the relevant art, a network administrator or automated network sensors can detect a high likelihood of a network based attack and trigger a high alert state. As those of ordinary skill in the relevant art know, a network administrator can manually trigger a high alert state response to a suspicion that a network based attack is likely (e.g., in response to a news report, or the detection of suspicious activity on the network). Ordinarily skilled artisans are also familiar with automated system for triggering high alert states, response to automatic detection of suspicious activity, such as attempts to transmit too many packets across specific network infrastructure within a specific time frame, or the detection of a large number of security alerts at another location or plurality of locations. Of course, these examples are not exhaustive. Various manual and automated mechanisms for detecting suspicious activity and responsively triggering a high alert state are known to those of ordinary skill in the art, and all are within the scope of the present invention.

Once a high likelihood of a network based attack has been detected and a high alert state triggered, various defensive mechanisms can be put into place to prevent the network based attack. The attack preventing mechanism of interest within the context of the present invention is the blocking of incoming network traffic 103 containing code 107.

As illustrated in FIG. 2, the incoming network traffic manager 101 monitors 201 incoming network traffic 103 addressed to a target computer 105. The incoming network traffic manager detects 203 incoming network traffic 103 containing code 107, as discussed above. Responsive to a high alert state indicating a likelihood of a network based attack, the incoming network traffic manager 101 blocks 205 incoming network traffic 103 containing code 107 from reaching the target computer 105.

Figure 3:
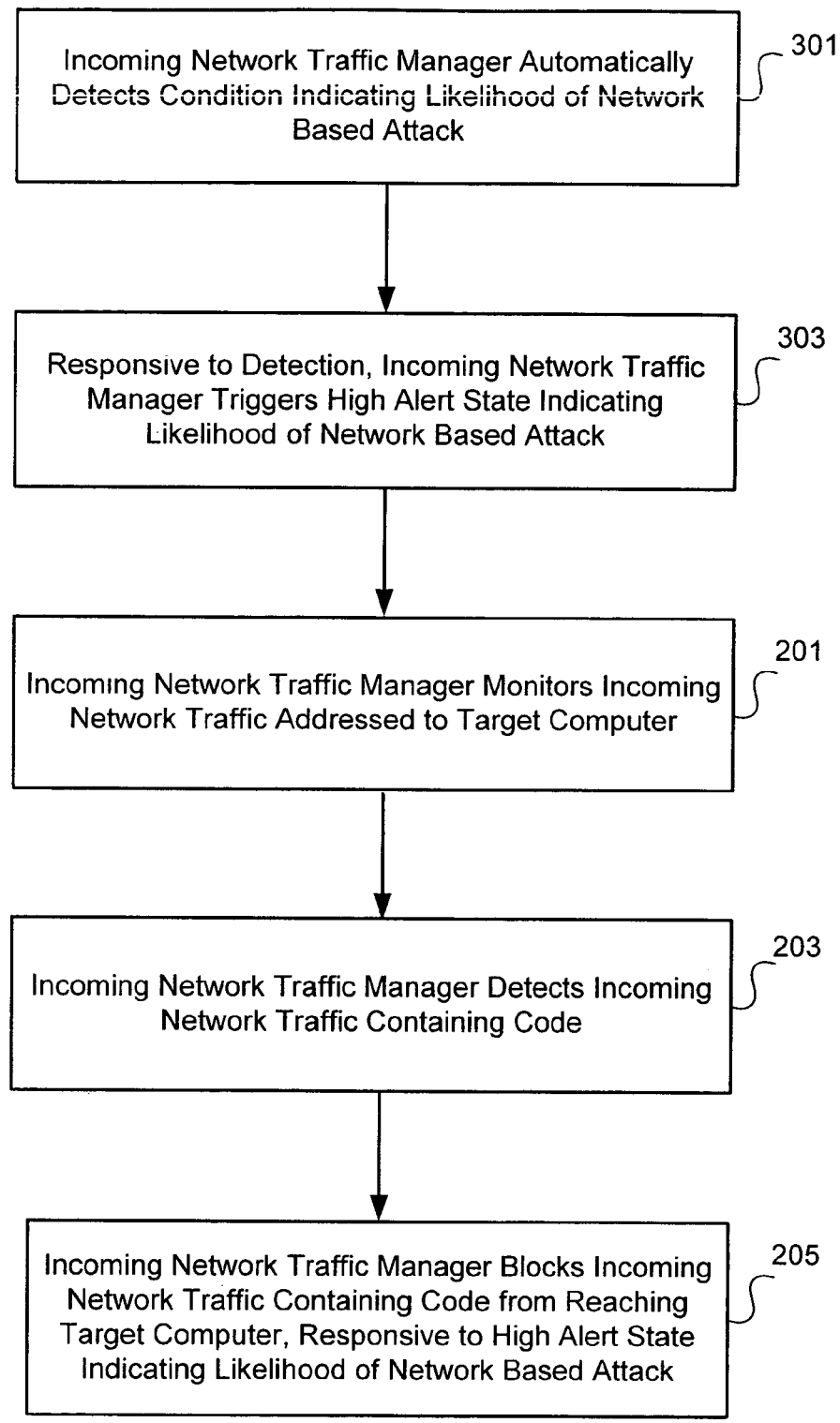
FIG. 3 is a flowchart illustrating steps for performing an embodiment of the present invention in which the incoming network traffic manager includes automated sensors for detecting suspicious network activity.

FIG. 3 illustrates steps for performing an embodiment of the present invention in which the incoming network traffic manager 101 includes automated sensors for detecting suspicious network activity. The incoming network traffic manager 101 automatically detects 301 a condition indicating a likelihood of a network based attack. Responsive to the detection, the incoming network traffic manager 101 triggers 303 a high alert state indicating a likelihood of a network based attack. As explained above in conjunction with FIG. 2, the incoming network traffic manager 101 monitors 201 incoming network traffic 103 addressed to a target computer 105. The incoming network traffic manager detects 203 incoming network traffic 103 containing code 107. Responsive to the high alert state indicating a likelihood of a network based attack, the incoming network traffic manager 101 blocks 205 incoming network traffic 103 containing code 107 from reaching the target computer 105.

Figure 4:
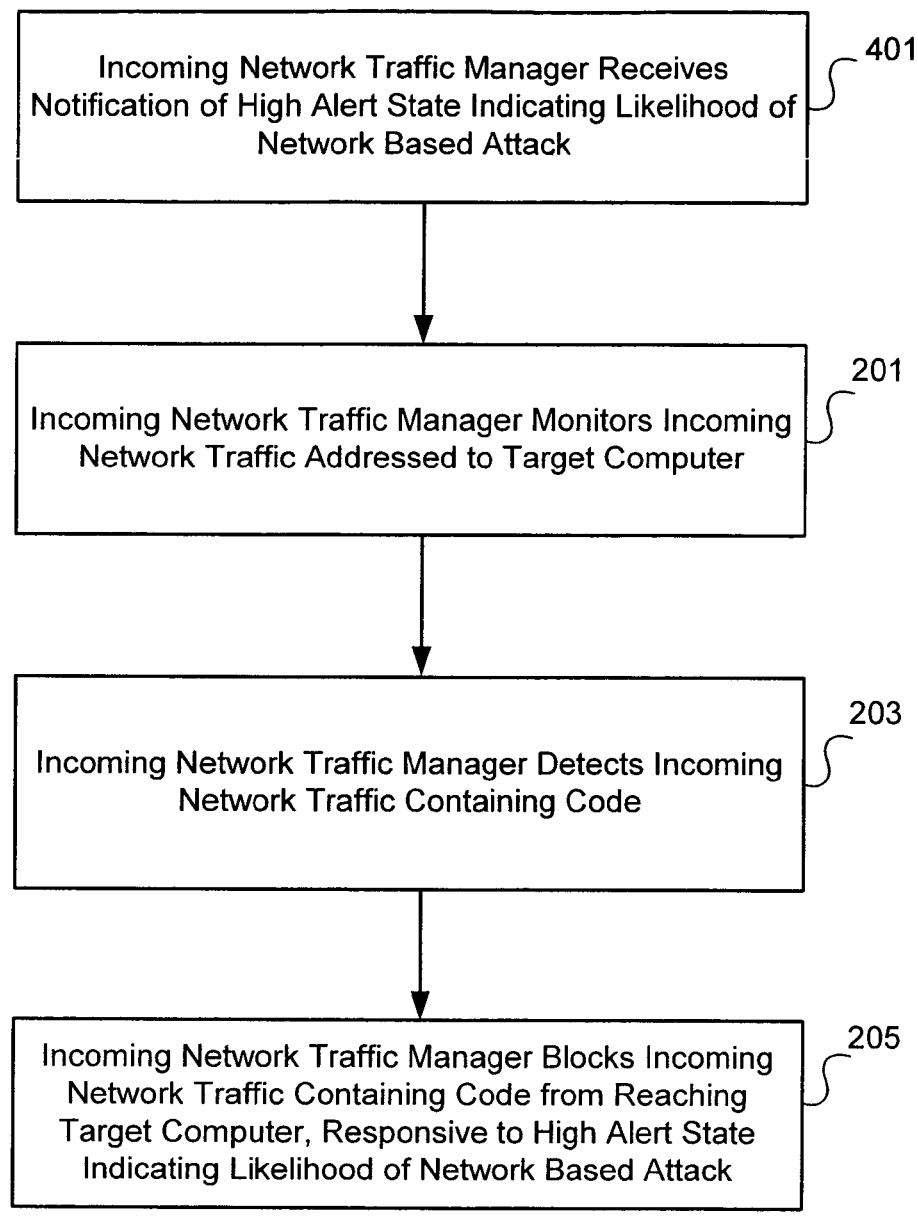
FIG. 4 is a flowchart illustrating steps for performing an embodiment of the present invention, in which notification of a high alert state originates from a source external to the incoming network traffic manager.

FIG. 4 illustrates steps for performing a similar embodiment, where the notification of the high alert state originates from a source external to the incoming network traffic manager 101 (e.g., from a network administrator or an external automated process). The incoming network traffic manager 101 receives 401 a notification of a high alert state indicating a likelihood of a network based attack. As with the embodiments illustrated in FIGS. 2 and 3, the incoming network traffic manager 101 monitors 201 incoming network traffic 103 addressed to a target computer 105. The incoming network traffic manager detects 203 incoming network traffic 103 containing code 107. Responsive to the high alert state indicating a likelihood of a network based attack, the incoming network traffic manager 101 blocks 205 incoming network traffic 103 containing code 107 from reaching the target computer 105.

Figure 5:
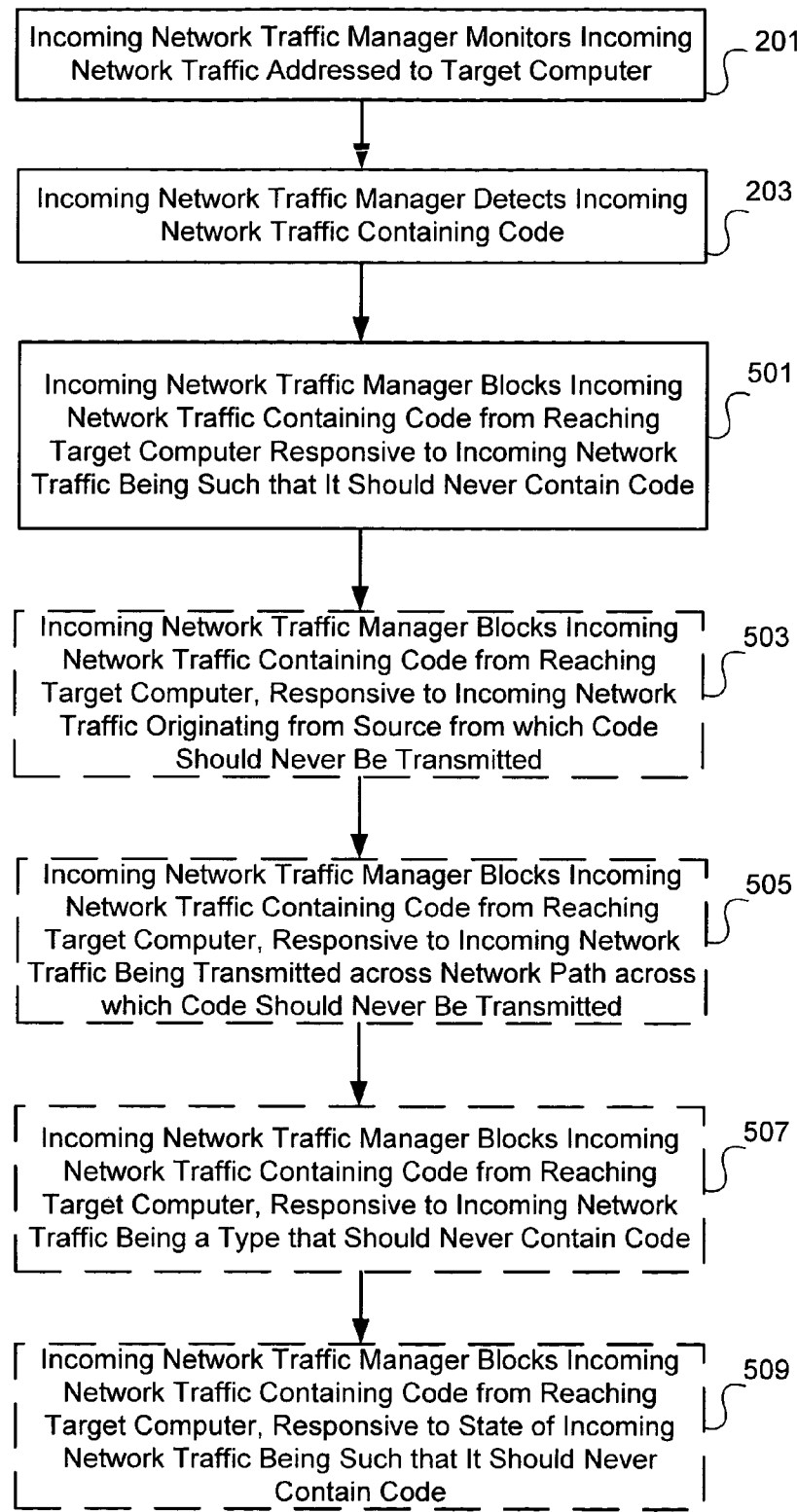
FIG. 5 is a flowchart illustrating steps for performing embodiments of the present invention in which the circumstances rendering it undesirable to allow incoming network traffic containing code to reach the target computer comprise the incoming network traffic being such that it should never contain code.

FIG. 5 illustrates steps for performing embodiments of the present invention in which the circumstances rendering it undesirable to allow incoming network traffic 103 containing code 107 to reach the target computer 103 comprise the incoming network traffic 103 being such that it should never contain code 107. Some networks connections, by design, should never be used to transmit traffic containing code 107. One example would be a dedicated connection between a web server and a database server, the only purpose of which is to allow a web application to retrieve and store data records. Furthermore, specific types of network traffic should never contain code 107. Non-exhaustive examples include parameters to Simple Mail Transfer Protocol commands, specifications of Uniform Resource Locators in Hypertext Transfer Protocol requests and parameters to POP or IMAP commands. Other examples of network connections, transmission sources and types of network traffic that should never contain code 107 will be apparent to those of ordinary skill in the relevant art in light of this specification. The present invention can block incoming network traffic 103 containing code 107, responsive to such circumstances.

Turning to FIG. 5, the incoming network traffic manager 101 monitors 201 incoming network traffic 103 addressed to a target computer 105. The incoming network traffic manager detects 203 incoming network traffic 103 containing code 107. Responsive to the incoming network traffic 103 being such that it should never contain code 107, the incoming network traffic manager 101 blocks 501 incoming network traffic 103 containing code 107 from reaching the target computer 105.

As illustrated in FIG. 5, in some embodiments blocking 501 incoming network traffic 103 containing code 107 responsive to the incoming network traffic 103 being such that it should never contain code 107 comprises the incoming network traffic manager 101 blocking 503 incoming network traffic 103 containing code 107 from reaching the target computer 105, responsive to the incoming network traffic 103 having originated from a source from which code 107 should never be transmitted (e.g., a dedicated database server).

In other embodiments, blocking 501 incoming network traffic 103 containing code 107 responsive to the incoming network traffic 103 being such that it should never contain code 107 comprises the incoming network traffic manager 101 blocking 503 incoming network traffic 103 containing code 107 from reaching the target computer 105, responsive to the incoming network traffic 103 being transmitted across a network path across which code 107 should never be transmitted (e.g., a dedicated connection between a web server and a database server).

In yet other embodiments, blocking 501 incoming network traffic 103 containing code 107 responsive to the incoming network traffic 103 being such that it should never contain code 107 comprises the incoming network traffic manager 101 blocking 507 incoming network traffic 103 containing code 107 from reaching the target computer 107, responsive to the incoming network traffic 103 being a type that should never contain code 107 (e.g., a parameter to a Simple Mail Transfer Protocol command, the specification of a Uniform Resource Locator in a Hypertext Transfer Protocol request, or a parameter to a POP or an IMAP command).

In still other embodiments, incoming network traffic 103 containing code 107 is blocked 501 based on state. In these embodiments, the incoming network traffic manager 101 blocks 509 incoming network traffic 103 containing code 107 from reaching the target computer 107, responsive to the state of the incoming network traffic 103 being such that it should never contain code 107. Transmission protocols have multiple states, some of which should never include the transmission of code 107. For example, network traffic 103 transmitted according to the Hypertext Transfer Protocol can comprise requests and responses. Requests should never contain code 107, whereas as the body of a response can. Thus, in embodiments that block 509 network traffic 103 containing code 107 based on state, all Hypertext Transfer Protocol network traffic 103 in the request state would be blocked if it contained code 107. Of course, Hypertext Transfer Protocol request state is only an example of a protocol state that should never contain code. Other examples will be readily apparent to those of ordinary skill in the relevant art in light of this specification.

Figure 6:
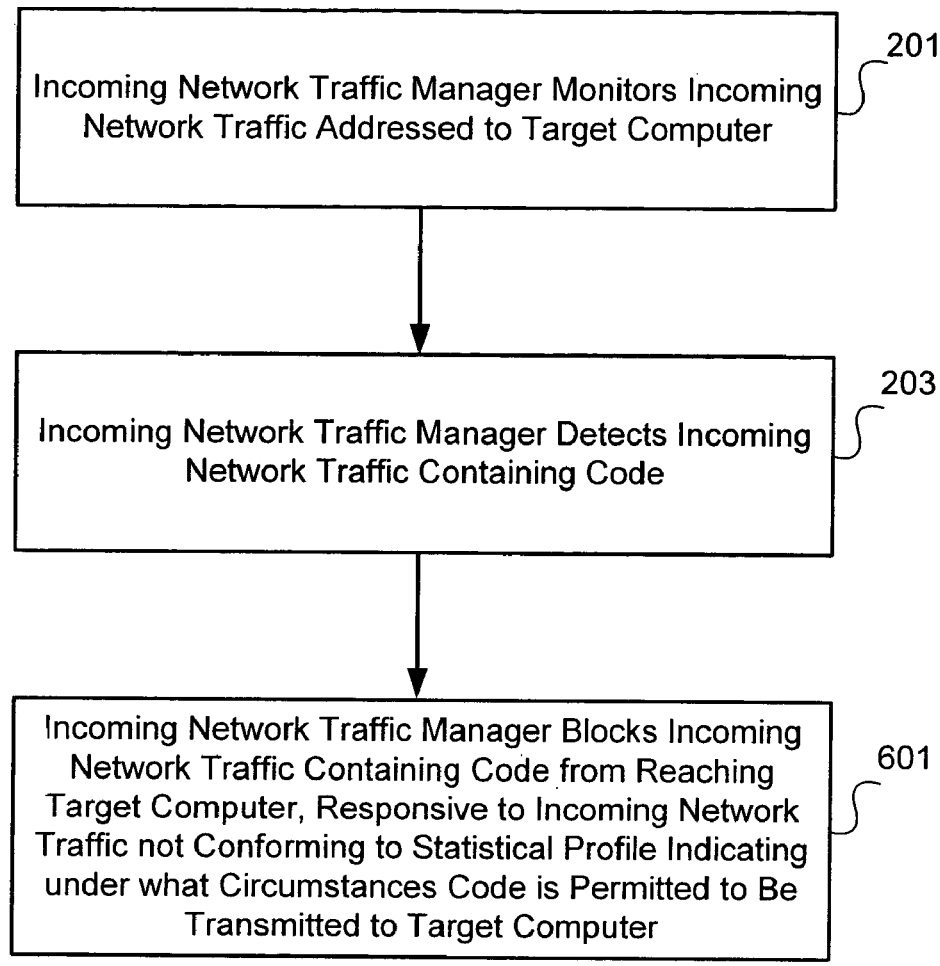
FIG. 6 is a flowchart illustrating steps for performing other embodiments of the present invention, in which the circumstances rendering it undesirable to allow incoming network traffic containing code to reach the target computer comprise the incoming network traffic not conforming to a statistical profile indicating the circumstances under which code is permitted to be transmitted to the target computer.

FIG. 6 illustrates steps for performing other embodiments of the present invention, in which the circumstances rendering it undesirable to allow incoming network traffic 103 containing code 107 to reach the target computer 103 comprise the incoming network traffic 103 not conforming to a statistical profile indicating the circumstances under which code 107 is permitted to be transmitted to the target computer 105. In some instances, it will be appropriate for incoming network traffic 103 to contain code 107 under specific circumstances only. The circumstances under which it is permissible to transmit code 107 to a target computer 105 can be specified by an associated statistical profile. For example, a statistical profile for a given target computer 105 could indicate specific times at which it permissible to transmit code 107 to the target computer 105, specific protocols according to which it is permissible to transmit code 107, specific ports via which it is permissible to transmit code 107, specific frequencies at which it is permissible to transmit code 107 (e.g., only once per hour), specific protocol states in which it is permissible to transmit code 107, specific addresses to which it is permissible to transmit code 107, and/or specific addresses from which it is permissible to transmit code 107, or any combination thereof. These articulated restrictions are only examples, and others will be apparent to those of ordinary skill in the relevant art in light of this specification. The statistical profile associated with a target computer 105 can include any criteria specifying under which circumstances it is and is not appropriate for the target computer to receive incoming network traffic 103 containing code 107. The incoming network traffic manager 101 can then utilize that information to block inappropriate code 107 transmissions to the target computer 105.

Turning to FIG. 6, as describe above in the discussion of FIG. 2, the incoming network traffic manager 101 monitors 201 incoming network traffic 103 addressed to the target computer 105. The incoming network traffic manager detects 203 incoming network traffic 103 containing code 107, as discussed above. The incoming network traffic manager 101 blocks 601 incoming network traffic 103 containing code 107 from reaching the target computer 105, responsive to the incoming network traffic 103 not conforming to a statistical profile indicating the circumstances under which code 107 is permitted to be transmitted to the target computer 105. In other words, the incoming network traffic manager 101 enforces the statistical profile indicating the circumstances under which code 107 is permitted to be transmitted to the target computer 105.

Figure 7:
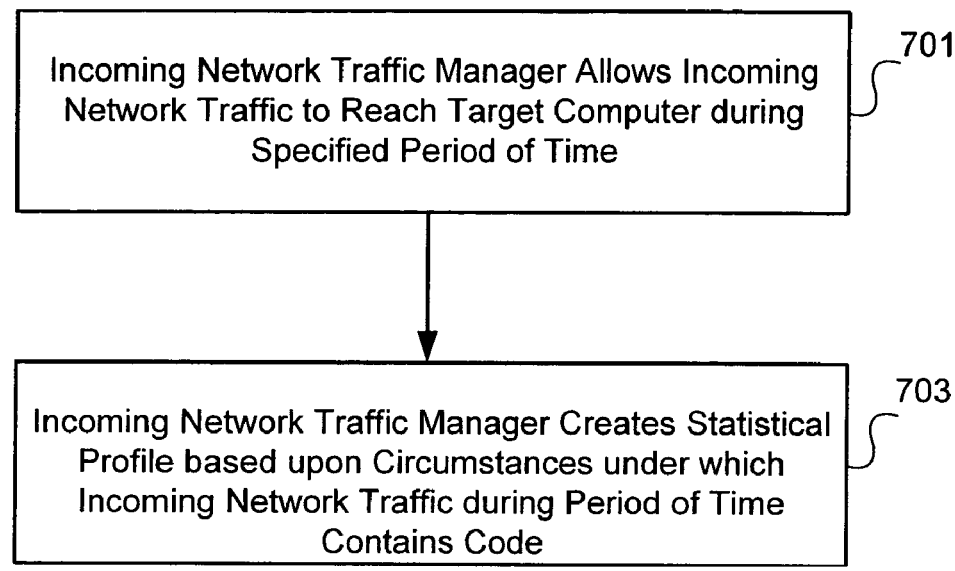
FIG. 7 is a flowchart illustrating steps for performing some embodiments of the present invention, in which the incoming network traffic manager creates a statistical profile by observing incoming network traffic transmitted to the target computer.

In some embodiments of the present invention, the incoming network traffic manager 101 can create the statistical profile by observing incoming network traffic 103 transmitted to the target computer 105 during a trusted period of time. Steps for performing such embodiments are illustrated by FIG. 7. The incoming network traffic manager 101 allows 701 incoming network traffic 103 to reach the target computer 105 during a specified period of time. The specified period of time would be one in which the incoming network traffic manager 101 could trust the benevolence of the incoming network traffic 103, and thus use the patterns thereof to learn under what circumstances code 107 is permitted to be transmitted to the target computer 105. The incoming network traffic manager 101 proceeds to create 703 the statistical profile based upon circumstances under which the incoming network traffic 103 during the period of time contains code 107.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer-implemented method for circumstantially blocking incoming network traffic containing code, the method comprising the steps of:
   monitoring incoming network traffic of a protocol and being addressed to a target computer, the protocol comprising a transmission protocol, and the incoming network traffic being transmitted using the transmission protocol;
   detecting incoming network traffic containing code; and
   blocking incoming network traffic containing code from reaching the target computer, responsive to the incoming network traffic being traffic that should never contain code according to the protocol.

2. The method of claim 1 wherein the step of blocking incoming network traffic containing code from reaching the target computer further comprises:
   blocking incoming network traffic containing code from reaching the target computer, responsive to a high alert state indicating a likelihood of a network based attack.

3. The method of claim 2 further comprising:
   automatically detecting a condition indicating a likelihood of a network based attack; and
   responsive to the detection, triggering a high alert state indicating a likelihood of a network based attack.

4. The method of claim 2 further comprising:
   receiving a notification of a high alert state indicating a likelihood of a network based attack.

5. The method of claim 1 wherein the step of blocking incoming network traffic containing code from reaching the target computer further comprises:
   blocking incoming network traffic containing code from reaching the target computer, responsive to the incoming network traffic originating from a source from which code should never be transmitted.

6. The method of claim 1 wherein the step of blocking incoming network traffic containing code from reaching the target computer further comprises:
   blocking incoming network traffic containing code from reaching the target computer, responsive to the incoming network traffic being transmitted across a network path across which code should never be transmitted.

7. The method of claim 1 wherein the step of blocking incoming network traffic containing code from reaching the target computer responsive to the incoming network traffic being traffic that should never contain code according to the protocol further comprises:
   blocking incoming network traffic containing code from reaching the target computer, responsive to the incoming network traffic being a type that should never contain code according to the protocol.

8. The method of claim 1 wherein the step of blocking incoming network traffic containing code from reaching the target computer further comprises:
   blocking incoming network traffic containing code from reaching the target computer, responsive to the incoming network traffic not conforming to a statistical profile indicating under what circumstances code is permitted to be transmitted to the target computer.

9. The method of claim 8 wherein the step of blocking incoming network traffic containing code from reaching the target computer, responsive to the incoming network traffic not conforming to a statistical profile indicating under what circumstances code is permitted to be transmitted to the target computer further comprises:
   blocking incoming network traffic containing code from reaching the target computer, responsive to the incoming network traffic having one or more characteristics from a list of characteristics consisting of:
      being transmitted at a time at which code is not to be transmitted;
      being transmitted via a port via which code is not to be transmitted;
      being transmitted at a frequency at which code is not to be transmitted;
      being transmitted in a protocol state that should never contain code;
      being transmitted to an address to which code is not to be transmitted; and
      being transmitted from an address from which code is not to be transmitted.

10. The method of claim 8 further comprising:
    allowing incoming network traffic to reach the target computer during a specified period of time;
    creating the statistical profile based upon circumstances under which the incoming network traffic during the period of time contains code.

11. The method of claim 1 wherein the step of monitoring incoming network traffic of a protocol and being addressed to the target computer further comprises:
    scanning a stream.

12. The method of claim 1 wherein the step of monitoring incoming network traffic of a protocol and being addressed to the target computer further comprises:
    analyzing packets.

13. The method of claim 1 wherein the steps are performed by an incoming network traffic manager which is incorporated into at least one of the following:
    a firewall;
    an intrusion detection system;

an intrusion detection system application proxy;
a router;
a switch;
a stand alone proxy;
a server;
a gateway;
a client.

14. A non-transitory computer readable storage medium containing an executable computer program product for circumstantially blocking incoming network traffic containing code, the computer program product comprising:
program code for monitoring incoming network traffic of a protocol and being addressed to a target computer, the protocol comprising a transmission protocol, and the incoming network traffic being transmitted using the transmission protocol;
program code for detecting incoming network traffic containing code; and
program code for blocking incoming network traffic containing code from reaching the target computer, responsive to the incoming network traffic being traffic that should never contain code according to the protocol.

15. The non-transitory computer readable storage medium of claim 14 further comprising:
program code for blocking incoming network traffic containing code from reaching the target computer, responsive to a high alert state indicating a likelihood of a network based attack.

16. The non-transitory computer readable storage medium of claim 14 further comprising:
program code for blocking incoming network traffic containing code from reaching the target computer, responsive to the incoming network traffic originating from a source from which code should never be transmitted.

17. The non-transitory computer readable storage medium of claim 14 further comprising:
program code for blocking incoming network traffic containing code from reaching the target computer, responsive to the incoming network traffic being transmitted across a network path across which code should never be transmitted.

18. The non-transitory computer readable storage medium of claim 14 further comprising:
program code for blocking incoming network traffic containing code from reaching the target computer, responsive to the incoming network traffic being a type that should never contain code.

19. The non-transitory computer readable storage medium of claim 14 further comprising:
program code for blocking incoming network traffic containing code from reaching the target computer, responsive to the incoming network traffic not conforming to a statistical profile indicating under what circumstances code is permitted to be transmitted to the target computer.

20. A computer system for circumstantially blocking incoming network traffic containing code, the computer system comprising:
a computer processor for executing computer program code; and
a computer-readable storage medium storing executable computer program code comprising:
a network traffic monitoring module configured to monitor incoming network traffic of a protocol and being addressed to a target computer, the protocol comprising a transmission protocol, and the incoming network traffic being transmitted using the transmission protocol;
a code detection module, configured to detect incoming network traffic containing code, the code detection module being communicatively coupled to the network traffic monitoring module; and
a code blocking module, configured to block incoming network traffic containing code from reaching the target computer, responsive to the incoming network traffic being traffic that should never contain code according to the protocol, the code blocking module being communicatively coupled to the code detection module.

21. The computer system of claim 20 wherein:
the network traffic monitoring module, the code detection module and the code blocking module are communicatively coupled to at least one of the following:
a firewall;
an intrusion detection system;
an intrusion detection system application proxy;
a router;
a switch;
a stand alone proxy;
a server;
a gateway;
a client.

22. The method of claim 1 wherein the step of blocking incoming network traffic containing code from reaching the target computer responsive to the incoming network traffic being traffic that should never contain code according to the protocol further comprises:
blocking incoming network traffic containing code from reaching the target computer, responsive to the incoming network traffic being in a state which should never contain code according to the protocol.

23. The computer program product of claim 14 further comprising:
program code for blocking incoming network traffic containing code from reaching the target computer, responsive to the incoming network traffic being in a state which should never contain code according to the protocol.

24. The method of claim 1, wherein the protocol comprises a content protocol, and content of the incoming network traffic should comply with the content protocol.

25. The computer readable medium of claim 14, wherein the protocol comprises a content protocol, and content of the incoming network traffic should comply with the content protocol.

26. The computer system of claim 20, wherein the protocol comprises a content protocol, and content of the incoming network traffic should comply with the content protocol.

* * * * *